United States Patent

Miyazaki et al.

[11] Patent Number: 5,864,422
[45] Date of Patent: Jan. 26, 1999

[54] LIGHT AMPLIFIER DEVICE CAPABLE OF SUPPRESSING LIGHT SURGE

[75] Inventors: Satoru Miyazaki, Fukuoka; Kazuya Amaki, Kawasaki, both of Japan

[73] Assignee: Fujitsu Limited, Kanagawa, Japan

[21] Appl. No.: 615,620

[22] Filed: Mar. 13, 1996

[30] Foreign Application Priority Data

Jun. 28, 1995 [JP] Japan ................................. 7-161727

[51] Int. Cl.[6] ................... H01S 3/00; G02F 1/39
[52] U.S. Cl. .................. 359/341; 359/134; 359/187; 359/345
[58] Field of Search .................... 359/134, 160, 359/177, 187, 194, 337, 341, 345

[56] References Cited

U.S. PATENT DOCUMENTS

| 5,138,621 | 8/1992 | Goto ........................................ 372/38 |
| 5,500,762 | 3/1996 | Uchiyama et al. .................... 359/326 |
| 5,510,926 | 4/1996 | Bayart et al. .......................... 359/160 |

FOREIGN PATENT DOCUMENTS

| 4020081 | 12/1990 | European Pat. Off. . |
| 6216452 | 8/1994 | Japan . |

OTHER PUBLICATIONS

Furukawa et al, IEEE Photonies. Techn. Lett., (USA), vol. 7, #5, pp. 540–542, May 1995; abst. only herewith.

*Primary Examiner*—Nelson Moskowitz
*Attorney, Agent, or Firm*—Helfgott & Karas, P C.

[57] ABSTRACT

In a light amplifier device having a rare-earth element doped optical fiber to which an input light signal and an exciting light are applied, an exciting-light emitting part generates the exciting light. A variable attenuator which attenuates the exciting light applied. A driving part which supplies a driving current to the exciting light part. A monitor part monitors the input light signal. A light-emitting part generates a light in a wavelength band which includes a wavelength of the input light signal. A control part for controlling either the attenuator or driving part, when the monitor part detects a change in the input light signal, so that the light generated by the light-emitting part is applied to the rare-earth element doped optical fiber.

13 Claims, 14 Drawing Sheets

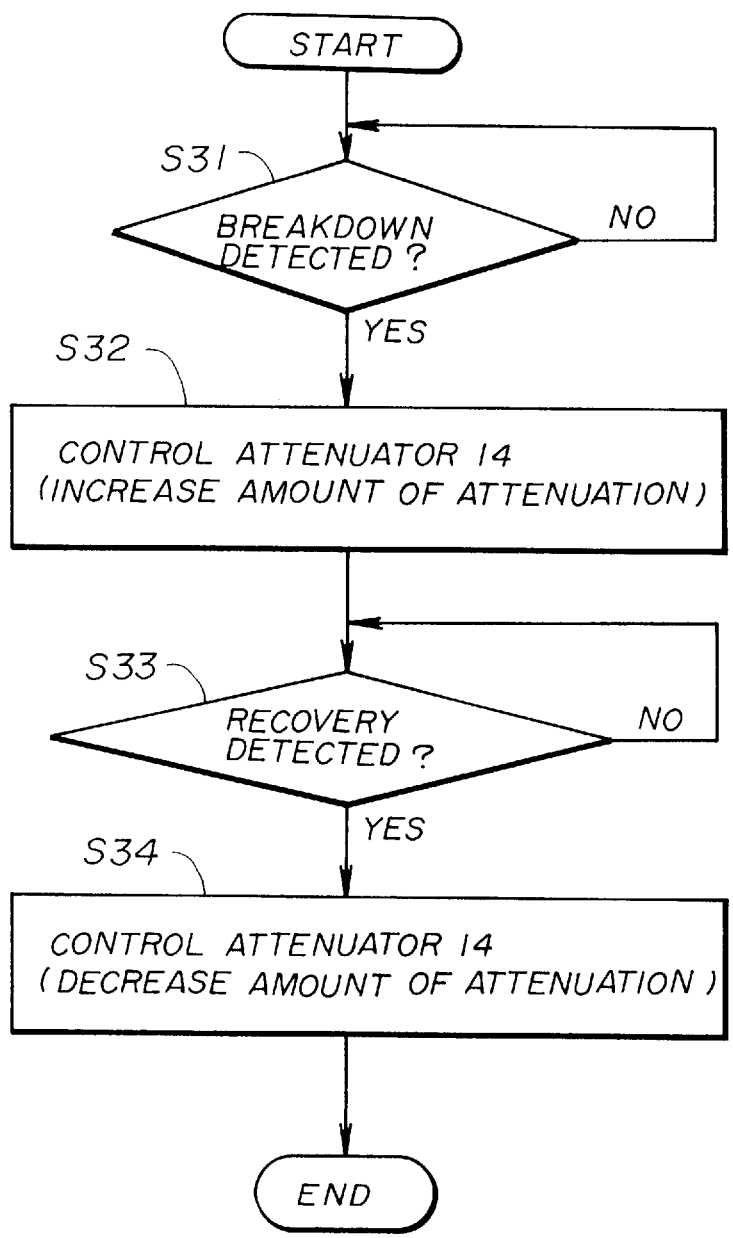

LIGHT AMPLIFIER DEVICE CAPABLE OF SUPPRESSING LIGHT SURGE

BACKGROUND OF THE INVENTION

1. Background of the Invention

The present invention generally relates to a light amplifier device capable of suppressing a light surge.

A light amplifier device is known in which a signal light and an exciting light are applied to an optical fiber doped with a rare-earth element such as erbium (Er). Such an amplifier is capable of amplifying the signal light per se, and is thus applied to a repeater amplifier in a long-distance light transmission system. In the light amplifier device using a rare-earth element doped optical fiber, it is known that a light surge occurs when the light signal is recovered immediately after the light signal is broken down. Such a light surge may damage optical circuit components in parts of the subsequent stages. Hence, it is desired to suppress the light surge.

2. Description of the Related Art

Generally, the light amplifier device uses an erbium-doped optical fiber which amplifies a light signal in the 1.5 $\mu$m band. Also, there are known light amplifier devices that utilize a neodymium-doped (Nd-doped) optical fiber capable of amplifying a light in the 1.06 $\mu$m or 1.32 $\mu$m band, and a praseodymium-doped (Pr-doped) optical fiber capable of amplifying a light in the 1.3 $\mu$m band. Generally, the gain of the light amplifier device is controlled by controlling the power of the exciting light. Alternatively, the light amplifier device having an optical fiber as described above has a saturation characteristic, and therefore the gain thereof can be controlled with the power of the exciting light kept constant.

As described above, a light surge occurs when the light signal is recovered immediately after the light signal is broken down, for example, after a short period of approximately 10 $\mu$s. Such a short-period breakdown results from, for example, an instantaneous breakdown of an electric signal on the transmit side, an inserting and detaching step of an optical connector, or bending of the optical fiber with a small radius of curvature. When the light signal is recovered after the short-period breakdown, energy of the exciting light or the like stored in the rare-earth-doped optical fiber produces a light surge. If the light surge is input to a photodiode which is a component of a light-receiving part, the photodiode may be destroyed. If an oil film is present between the interface of joined fibers in the optical connector, the optical fibers may be blackened and thus the optical connector may be damaged. If the light surge is emitted outside, humans or animals may be affected.

With the above in mind, a structure provided on the input side of the light amplifier device has been proposed in which a light component extracted from a received (input) light signal is converted into an electric signal, which is monitored in order to determine whether the input light signal is normal. If a breakdown of the input light signal is detected, the operation of a semiconductor laser which emits the exciting light is stopped. There is an alternative proposal in which when the breakdown of the input light signal is detected, a light switch is turned off in order to prevent the amplified light signal from being applied to a following stage.

Another alternative has been proposed in, for example, Japanese Laid-Open Patent Application No. 6-204947. More particularly, the wavelength of the light signal is set outside of the maximum gain wavelength band of the light amplifier device using the rare-earth element doped optical fiber. An optical filter that has a blocking band including the above maximum gain wavelength is proposed. The optical filter functions to block the light surge because the light surge occurs at the maximum gain wavelength of the light amplifier device.

However, the above related art has the following disadvantages. As described above, the occurrence of the light surge is suppressed by stopping, in response to the detection of the breakdown of the input light signal, operation of the semiconductor laser which outputs the exciting light. When the input light signal is recovered, the semiconductor laser is driven again, and thus the input light signal is amplified. However, it takes a certain time to recover the normal amplifying gain. This is not good for a long-distance light transmission system which includes a plurality of light repeaters installed at given intervals. The time necessary to totally recover the normal gain in the whole system is increased in proportion to the number of repeaters. Further, the light amplifier device does not have any means for detecting the light surge although it has the function of detecting the breakdown of the input light signal. Hence, it is impossible to prevent the light surge from being amplified and output.

In the structure that uses the light switch which prevents the light signal and the light surge from being applied to a following stage, it is required that the light switch and its driving circuit operate at a high speed. However, in practice, it is not easy to provide a light switch which has a small insertion loss and a high operation speed.

In the structure that uses the light filter, it is required that the light filter has a sharp filter response capable of cutting off the maximum gain wavelength of the light amplifier device. However, in practice, it is not easy to provide a light filter having such a sharp cutoff response.

SUMMARY OF THE INVENTION

It is a general object of the present invention to provide a light amplifier device in which the above disadvantages are eliminated.

A more specific object of the present invention is to provide a light amplifier device capable of suppressing a light surge by simple means.

The above objects of the present invention are achieved by a light amplifier device having a rare-earth element doped optical fiber to which an input light signal and an exciting light are applied, the light amplifier device comprising: an exciting-light emitting part which generates the exciting light; a monitor part monitoring the input light signal; a light-emitting part generating a light in a wavelength band which includes a wavelength of the input light signal; and a control part which drives, when the monitor part detects a breakdown of the input light signal, the light-emitting part so that the light generated by the light-emitting part is applied to the rare-earth element doped optical fiber.

The above light amplifier device may further comprise a driving part which drives, when the monitor part detects a breakdown of the input light signal, the light-emitting part so that an output of the light generated by the light-emitting part is gradually increased.

The light-emitting part may comprise a semiconductor laser which emits a light in a wavelength band identical to that of the input light signal.

The light-emitting part may comprise a light-emitting diode which emits a light in a wavelength band identical to that of the input light signal.

The light amplifier device may further comprise a part which detects an amplified light signal from the rare-earth element doped optical fiber and controls the exciting-light emitting part so that power of the amplified light signal is maintained at a constant level.

The light amplifier device may further comprise a light filter which is provided before the monitor part and allows only a signal component contained in the input light signal to be applied to the monitor part.

The above objects of the present invention are also achieved by a light amplifier device having a rare-earth element doped optical fiber to which an input light signal and an exciting light are applied, the light amplifier device comprising: an exciting-light emitting part which generates the exciting light; a variable attenuator which attenuates the exciting light to be applied to the rare-earth element doped optical fiber; a monitor part monitoring the input light signal; and a control part which controls the variable attenuator so that, when the monitor part detects that the input light signal is outside of a given range, an amount of attenuation of the variable attenuator is increased.

The above objects of the present invention are also achieved by a light amplifier device having a rare-earth element doped optical fiber to which an input light signal and an exciting light are applied, the light amplifier device comprising: an exciting-light emitting part which generates the exciting light; a driving part which supplies a driving current to the exciting-light emitting part to drive the same; a monitor part monitoring the input light signal; and a control part which controls the driving part so that, when the monitor part detects that the input light signal is outside of a given range, the driving current supplied by the driving part is decreased.

BRIEF DESCRIPTION OF THE DRAWINGS

Other objects, features and advantages of the present invention will become more apparent from the following detailed description when read in conjunction with the accompanying drawings, in which:

FIG. 11 is a flowchart of an operation of a control circuit shown in FIG. 10;

DESCRIPTION OF THE PREFERRED EMBODIMENTS

Figure 1:
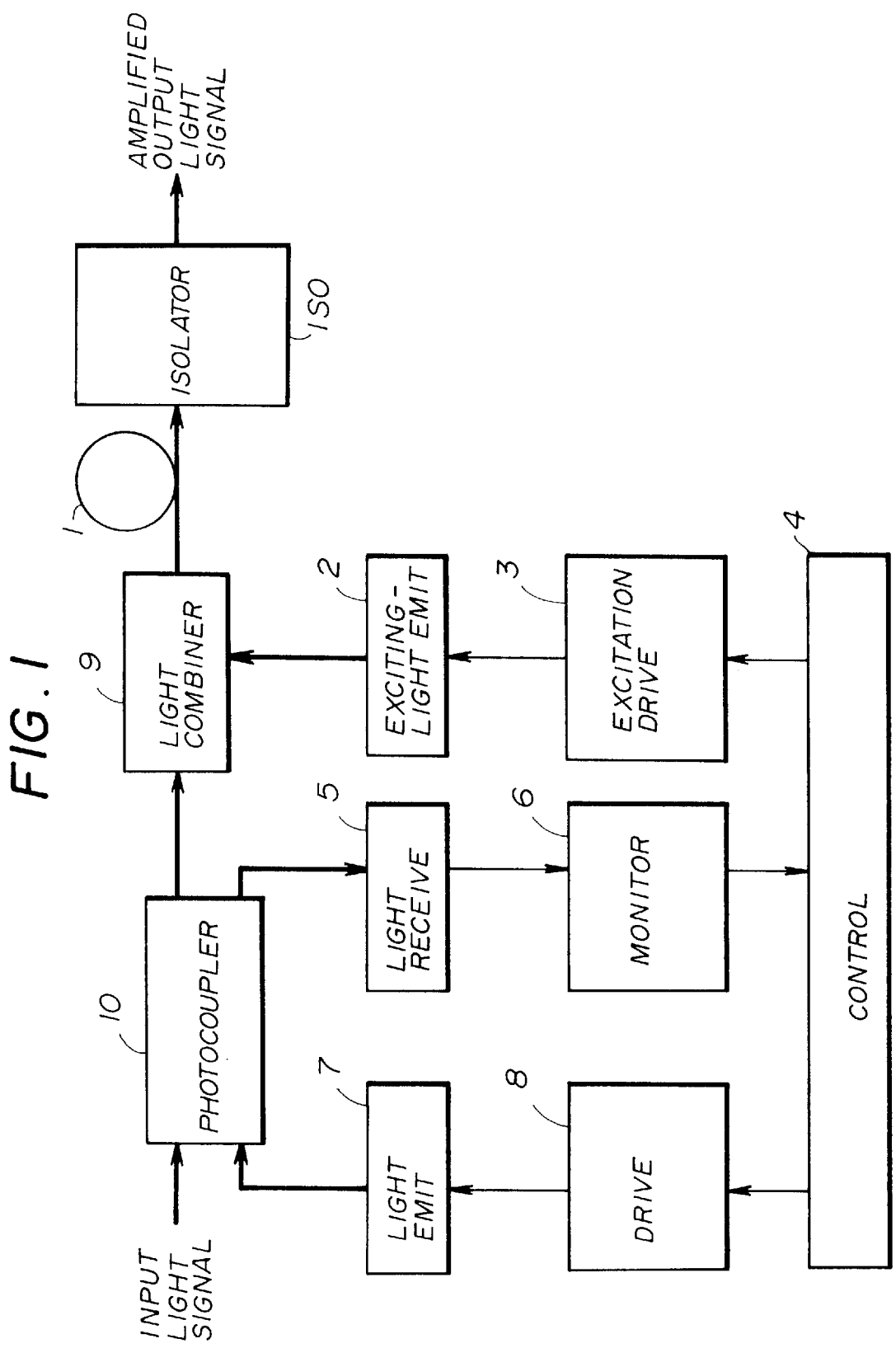
FIG. 1 is a block diagram of an outline of a light amplifier device according to the present invention.

Referring to FIG. 1, there is illustrated an outline of a light amplifier device capable of suppressing a light surge according to the present invention. An input light signal and an exciting light are applied to a rare-earth element doped optical fiber 1, which amplifies the received input light signal. The light amplifier device includes an exciting-light emitting part 2, an excitation driving part 3, a control part 4, a light-receiving part 5, a monitor part 6, a light-emitting part 7, a driving part 8, a light combining part 9 and a photocoupler 10.

The exciting-light emitting part 2 generates the exciting light to be applied to the optical fiber 1. The monitor part 6 monitors the input light signal. The light-emitting part 7 emits a light in a wavelength band which includes the wavelength of the input light signal. For example, the light-emitting part 7 emits a light in the same wavelength band as that of the input light signal. The control part 4 drives the light-emitting part 7 when the monitor part 6 detects a breakdown of the input light signal, so that the light emitted from the light-emitting part 7 can be input to the optical fiber 1.

When the breakdown of the input light signal is detected, the driving part 8 is controlled by the control part 4 so that the light output of the light-emitting part 7 is increased.

In FIG. 1, relatively thick lines denote paths of light, and relatively thin lines denote paths of electric signals. The input light signal is divided into two light components by the photocoupler 10. The light-receiving part 5 converts the light branching from the input light signal into an electric signal. The monitor part 6 monitors the level of the electric signal from the light-receiving part 5. When the monitor part 6 detects a breakdown of the input light signal, it notifies the control part 4 of the detected breakdown. Then, the control part 4 controls the driving part 8 to cause the light-emitting part 7 to start to operate. Thus, instead of the input light signal, the light emitted from the light-emitting part 7 is applied to the rare-earth doped optical fiber 1 through the photocoupler 10. In this case, the light which is not modulated is amplified through the optical fiber 1, and is output via an isolator ISO.

When the receipt of the input light signal is recovered, the monitor part 6 detects a level equal to the sum of the level of the input light signal and the level of the non-modulated light from the light-emitting part 7. In this case, the monitor part 6 informs the control part 4 of the recovery of receipt of the light signal. In response to the above recovery, the control part 4 controls the driving part 8 to cause the light-emitting part 7 to stop operating. In this case, the exciting-light emitting part 2 continues to operate, while the optical fiber 1 receives the input light signal or the non-modulated light from the light-emitting part 7. As a result, it is possible to prevent occurrence of the light surge.

In the above control, the control part 4 may control the driving part 8 so that the light output of the light-emitting part 7 is gradually increased in response to the detection of the breakdown of the input light signal.

The light-emitting part 7 may be formed of a semiconductor laser capable of outputting a light in a wavelength band which includes the wavelength of the input light signal. Alternatively, the light-emitting part 7 may be formed of a light-emitting diode capable of outputting a light having the same wavelength band as that of the input light signal.

A variable attenuator may be provided between the exciting-light emitting part 2 and the optical fiber 1, for example, between the light combining part 9 and the exciting-light emitting part 2. In this case, the monitor part 6 determines whether the input light signal has a level within a given range. When the monitor part 6 detects a decrease in the level caused by, for example, a breakdown of the input light signal, or an increase in the level caused by, for example, the light surge, the monitor part 6 informs the control part 4 of the above level change. Then, the control part 4 controls the variable attenuator to increase the amount of attenuation. Hence, the power of the exciting light is reduced and the amplifying gain is decreased, so that the occurrence of the light surge can be prevented.

The monitor part 6 may determine whether the input light signal has a level lower than a given level range due to a breakdown of the input light signal and whether the input light signal has a level higher than the given level range due to a light surge. When the monitor part 6 determines that the level of the input light signal is lower or higher than the given level range, the control part 4 controls the excitation driving part 3 to reduce the driving current of the exciting-light emitting part 2, so that the amplifying gain is reduced to suppress the light surge from being applied to a following stage.

Alternatively, means can be added which detects the amplified output light signal obtained at the output end of the optical fiber 1 and controls the excitation driving part 3 so that the output power of the amplified output light signal is constant.

A light filter can be used to cause only a signal component of the input light signal to be input to the monitor part 6. Hence, it is possible to avoid an influence of noise light and certainly detect a breakdown of the input light signal.

Figure 2:
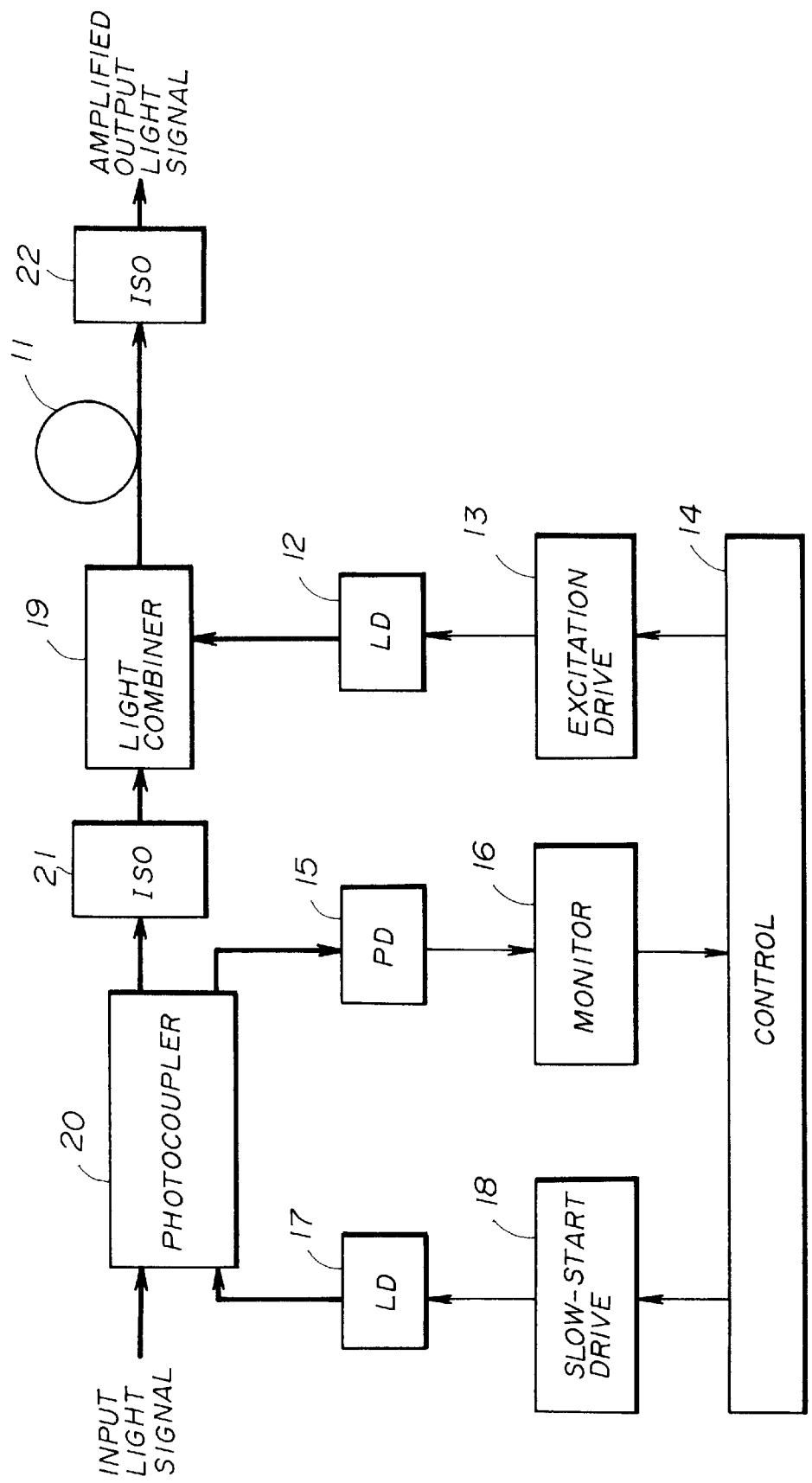
FIG. 2 is a block diagram of a light amplifier device according to a first embodiment of the present invention.

FIG. 2 is a block diagram of a light amplifier device according to a first embodiment of the present invention. The device shown in FIG. 2 includes an optical fiber 11 doped with a rare-earth element such as erbium (Er), an excitation semiconductor laser (LD) 12 corresponding to the exciting-light emitting part 2, an excitation driving circuit 13 corresponding to the excitation driving part 3, and a control circuit 14 corresponding to the control part 4. Further, the light amplifier device shown in FIG. 2 comprises a photodiode (PD) 15 corresponding to the light-receiving part 5, a monitor circuit 16 corresponding to the monitor part 6, a semiconductor laser (LD) 17 corresponding to the light-emitting part 7, and a slow-start driving circuit 18 corresponding to the driving part 8. Furthermore, the light amplifier device comprises a light combining element 19, a photocoupler 20 and isolators (ISO) 21 and 22, which allow light to be propagated in only the direction indicated by the arrow and prevent light from being propagated in the reverse direction.

The relatively thick lines denote light signal paths, and the relatively thin lines denote electric signal paths. An input light signal, which is received from a light transmission path or a preceding optical circuit, is input to the optical fiber 11 through the photocoupler 20, the isolator 21 and the light combining element 19. The photocoupler 20 applies part of the input light signal to the photodiode 15, which converts the received light signal into an electric signal. The electric signal output from the photodiode 15 is applied to the monitor circuit 16 as a signal dependent on the input light signal. The monitor circuit 16 compares the output electric signal of the photodiode 15 with a threshold value, and determines that the input light signal is broken down when the output signal is equal to or lower than the threshold value. In this case, the monitor circuit 16 applies a breakdown detection signal to the control circuit 14.

The excitation semiconductor laser 12 generates an exciting light in accordance with a driving current from the excitation driving circuit 13. The exciting light is applied to the optical fiber 11 through the light combining element 19, so that the input signal light can be amplified by the optical fiber 11. For example, when the input signal light has a wavelength in the 1.5 $\mu$m band, the wavelength of the exciting light is set equal to 1.48 $\mu$m or 0.9 $\mu$m. The amplified output light signal from the optical fiber 11 is sent, through the isolator 22, to a light transmission path or an optical circuit of the next stage.

Figure 3:
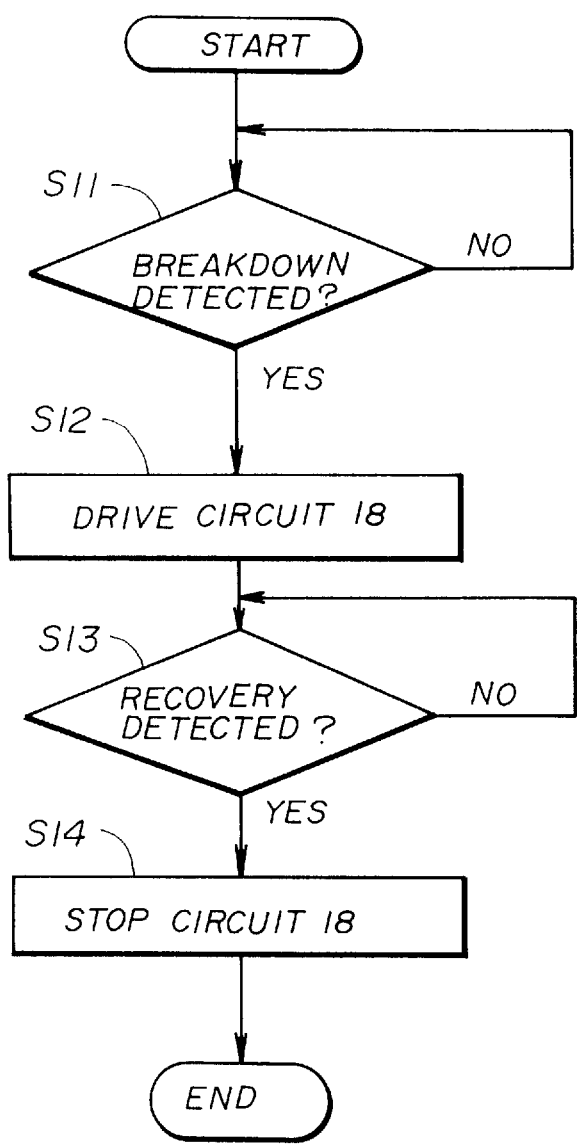
FIG. 3 is a flowchart of an operation of a control circuit shown in FIG. 2.

FIG. 3 is a flowchart of the control circuit 14. The control circuit 14 may be, for example, a microprocessor or a hardware circuit. In the following description, the control circuit 14 is formed of a microprocessor. When the control circuit 14 receives the breakdown detection signal from the monitor circuit 16, it drives the slow-start driving circuit 18 (steps S11 and S12). The semiconductor laser 17 generates a light in a wavelength band which includes the wavelength of the input light signal (for example, the same wavelength band), the above light having a level approximately equal to or less than that of the received input light signal. The slow-start driving circuit 18 driven by the control circuit 14 does not raise the final light output rapidly but raises it gradually. For example, the slow-start driving circuit 18 gradually increases the driving current for a period of tens to hundreds of milliseconds. Hence, immediately after the input light signal is broken down, the light which has the power gradually increased is applied to the optical fiber 11 instead of the input light signal.

Figure 4:
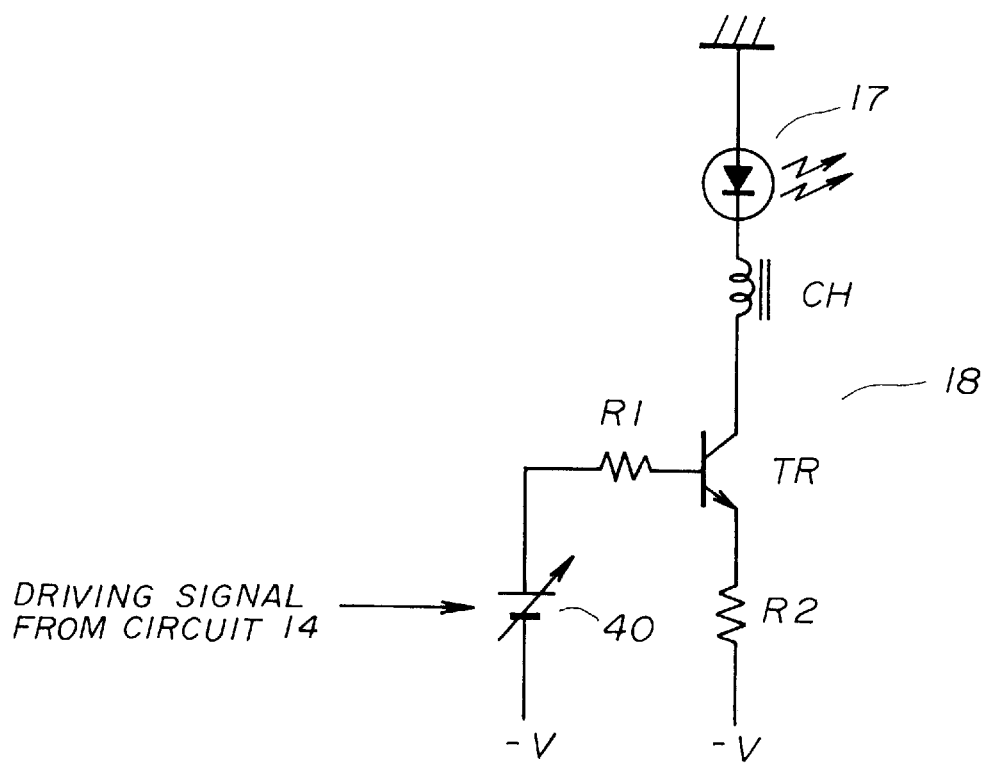
FIG. 4 is a circuit diagram of a slow-start driving circuit.

FIG. 4 is a diagram of an outline of the slow-start driving circuit 18, which includes a bipolar transistor TR, a variable bias source 40, resistors R1 and R2 and a choke coil CH. The anode terminal of the laser diode 17 is grounded, and the cathode terminal thereof is coupled to the collector of the transistor TR through the choke coil CH. The minus terminal of the source 40 and an end of the resistor R2 are connected to a reference voltage −V. The variable bias source 40 receives the driving signal from the control circuit 14, and thus the bias voltage is gradually increased. Hence, the current flowing in the laser diode 17 is gradually increased, so that the power emitted therefrom is gradually increased.

When the input light signal has recovered from the breakdown, the monitor circuit 16 detects the level equal to the sum of the level of the light from the semiconductor layer 17 and the received light signal. Then, the monitor circuit 16 sends a recovery detection signal to the control circuit 14. In response to this recovery detection signal, the control circuit 14 stops operating the slow-start driving circuit 18 in order to stop emitting the light from the semiconductor laser 17 (steps S13 and S14). In the above way, it is possible to certainly suppress the occurrence of the light surge due to an instantaneous breakdown of the input light signal.

It is possible for the excitation driving circuit 13 to control the excitation semiconductor laser 12 so that the exciting light from the excitation semiconductor laser 12 is maintained at a constant level. In this case, the monitor circuit 16 always monitors the level of the input light signal. The control circuit 14 controls the excitation driving circuit 13 on the basis of a fluctuation of the level of the input light signal. In this control step, the driving current flowing in the excitation semiconductor laser 12 is controlled so that the gain of the amplifier device is decreased when the input light signal has a high level and is increased when the input light signal has a low level. The above control step is a feed-forward control.

It is also possible to provide a light filter which is provided between the photocoupler 20 and the photodiode 15 and allow only the signal component of the input light signal to pass therethrough. Hence, a noise component is eliminated, and only the signal component of the input light signal is converted into an electric signal by means of the photodiode 15. As a result, it is possible to more precisely monitor the input light signal at the monitor circuit 16.

Figure 5:
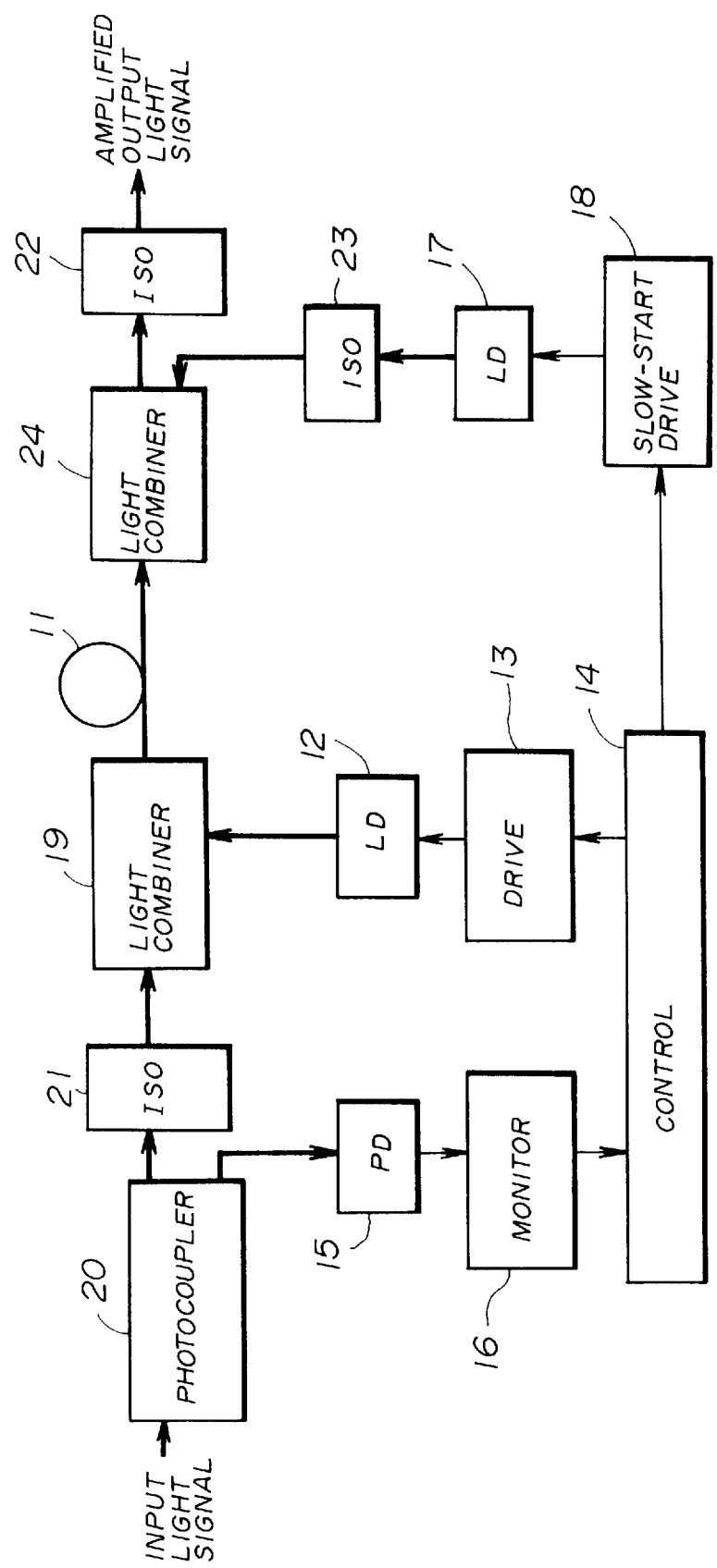
FIG. 5 is a block diagram of a light amplifier device according to a second embodiment of the present invention.

A description will now be given, with reference to FIG. 5 of a second embodiment of the present invention. In FIG. 5, parts that are the same as those shown in the previously described figures are given the same reference numbers. The light amplifier device shown in FIG. 5 includes an isolator (ISO) 23 and a light combining element 24. The monitor circuit 16 detects a breakdown of the input light signal, and sends it to the control circuit 14. Then, the control circuit 14 drives the slow-start driving circuit 18, which gradually increases the driving current of the semiconductor laser 17, so that the light output can be gradually increased. The light from the semiconductor laser 17 is input to the optical fiber 11 through the isolator 23 and the light combining element 24. The light from the semiconductor laser 17 is amplified by the exciting light from the excitation semiconductor laser 12, and the amplified light output signal is output to an optical transmission path or a subsequent-stage light circuit via the light combining element 24 and the isolator 22.

When the monitor circuit 16 detects recovery of the input light signal, it sends the recovery detection signal to the control circuit 14, which stops operating the slow-start driving circuit 18. Hence, the light emission of the semi-conductor laser 17 is stopped, and the light surge caused by an instantaneous breakdown of the input light signal can be suppressed.

As can be seen from the above, the control circuit 14 of the second embodiment of the present invention operates in accordance with the flowchart of FIG. 3.

Figure 6:
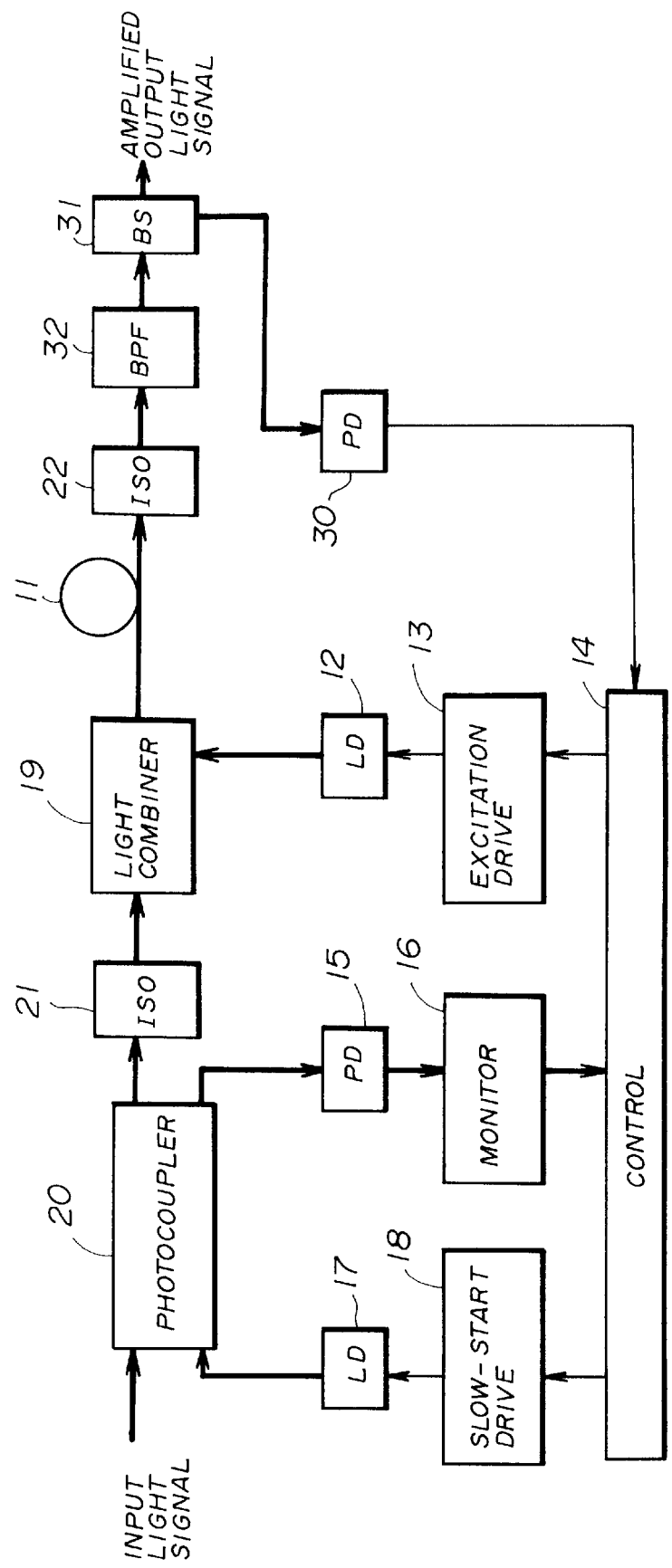
FIG. 6 is a block diagram of a light amplifier device according to a third embodiment of the present invention.

FIG. 6 is a block diagram of a light amplifier device according to a third embodiment of the present invention. In FIG. 6, parts that are the same as those shown in FIG. 5 are given the same reference numbers. The light amplifier device shown in FIG. 6 includes a photodiode (PD) 30, a beam splitter (BS) 31, and a light band-pass filter (BPF) 32. The structure shown in FIG. 6 differs from that shown in FIG. 2 in that the photodiode 30 is used to detect the amplified output light signal.

The third embodiment of the present invention operates in the same way as the second embodiment thereof. That is, when the monitor circuit 16 detects an instantaneous break-down of the light signal, it sends the breakdown detection signal to the control circuit 14, which drives the slow-start driving circuit 18. The light from the semiconductor laser 17 is input to the optical fiber 11 instead of the input light signal.

Figure 7:
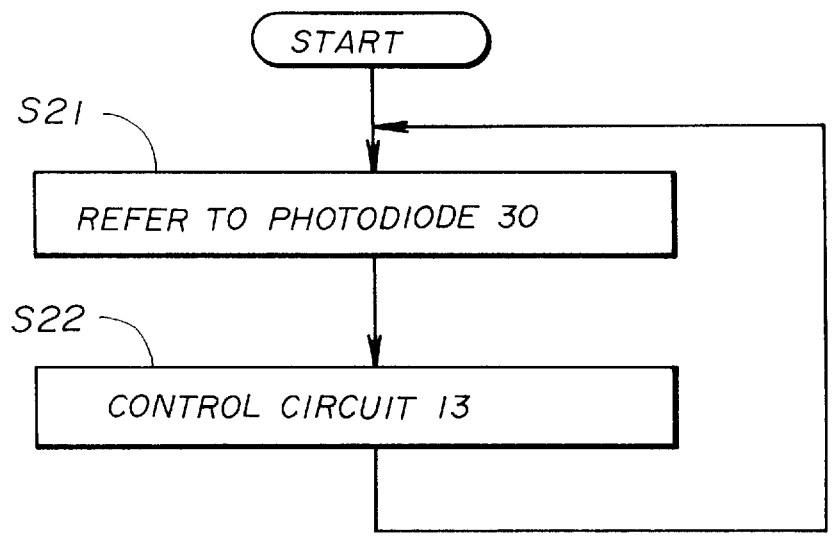
FIG. 7 is a flowchart of an operation of a control circuit shown in FIG. 6.

Further, the structure shown in FIG. 6 has the following function. Only a signal component contained in the amplified output light signal obtained through the optical fiber 11 is passed through the band-pass filter 32, and is applied to the beam splitter 31. Then, the beam splitter 31 outputs the received amplified output light signal to an optical transmission path or a subsequent-stage light circuit. Further, the beam splitter 31 extracts a part of the received amplified output light signal, and applies the extracted light to the photodiode 30. Then, the photodiode 30 detects the amplified output light signal, and sends a detection signal to the control circuit 14 (step S21 shown in FIG. 7). The control circuit 14 controls the excitation driving circuit 13 so that the amplified output light signal is maintained at a constant level (step S22). That is, the driving current of the excitation semiconductor laser 12 is controlled by a feedback control so that the amplified output light signal is maintained at the constant level.

If the input light signal breaks down, the light from the semiconductor laser 17 is applied to the optical fiber 11. The photodiode 30 detects the level of the amplified output light signal, and the control circuit 14 controls the excitation driving circuit 13 on the basis of the detected level of the amplified light output signal. Hence, even if the input light signal breaks down, it is possible to control the driving current flowing in the excitation semiconductor laser 12 to thereby prevent the amplifying gain from being rapidly increased. Hence, the light surge can be suppressed.

Figure 8:
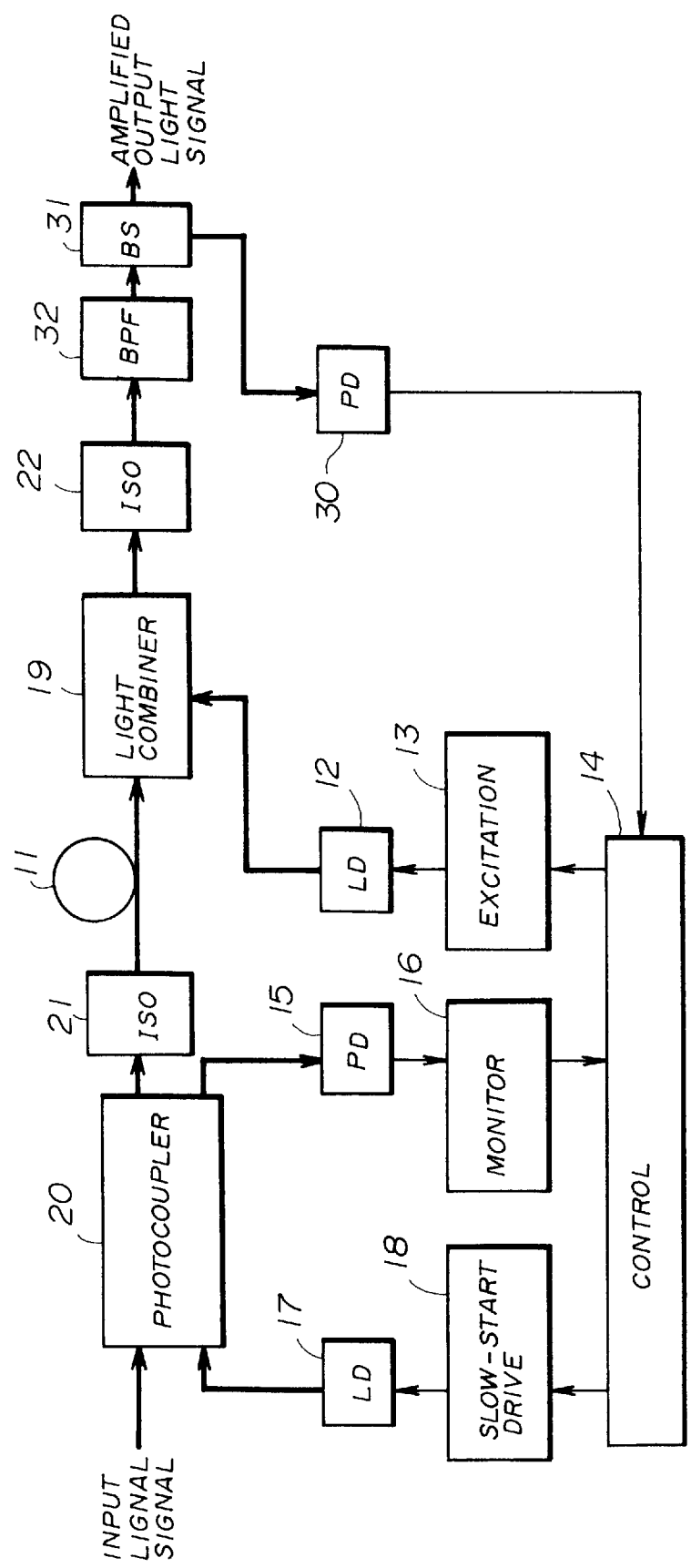
FIG. 8 is a block diagram of a light amplifier device according to a fourth embodiment of the present invention.

FIG. 8 is a block diagram of a light amplifier device according to a fourth embodiment of the present invention. The above-mentioned third embodiment of the present invention is of a forward excitation type, while the fourth embodiment thereof is of a backward excitation type. In FIG. 8, parts that are the same as those shown in the previously described figures are given the same reference numbers. The driving of the semiconductor laser 17 due to an instantaneous breakdown of the input light signal and the detection of the amplified output signal light by the photodiode 30 are the same as those of the third embodiment of the present invention. The exciting light emitted from the excitation semiconductor laser 11 is backwardly applied to the optical fiber through the light combining element 19.

Figure 9:
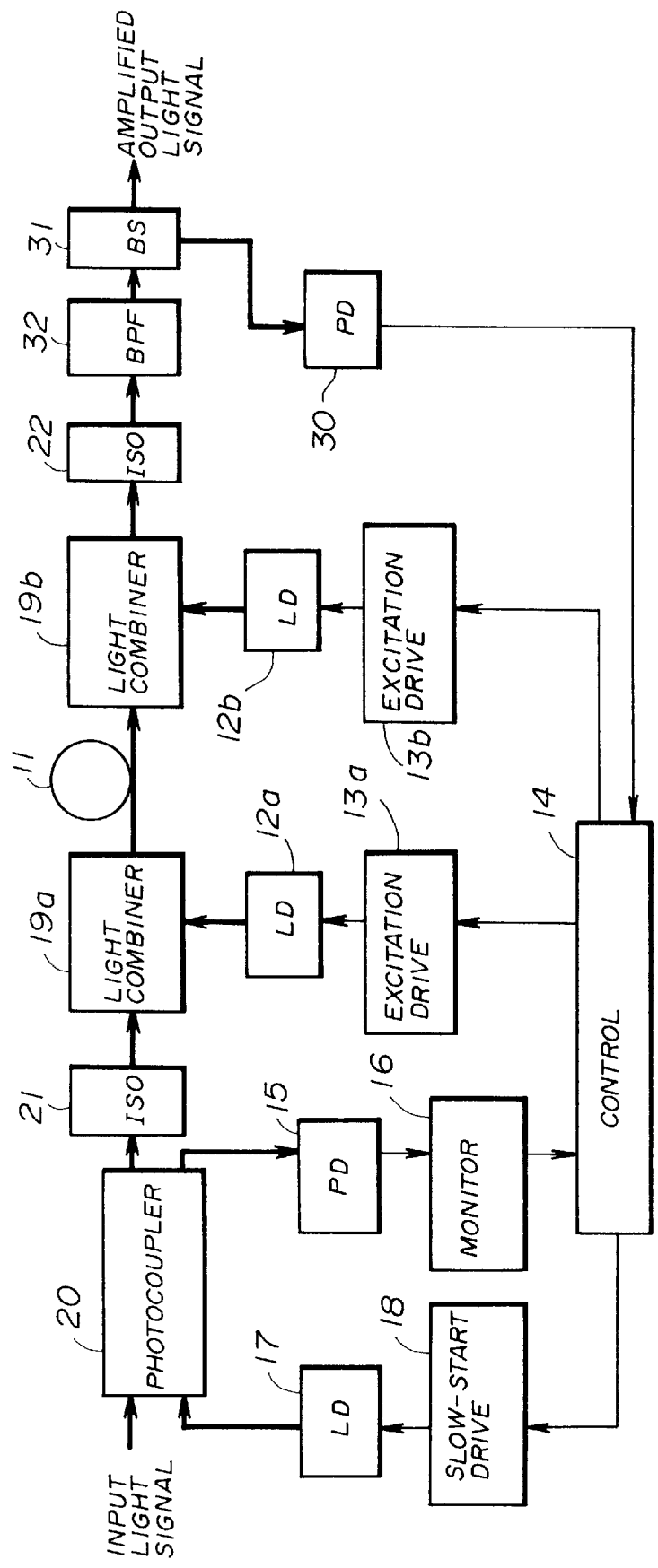
FIG. 9 is a block diagram of a light amplifier device according to a fifth embodiment of the present invention.

FIG. 9 is a block diagram of a light amplifier device according to a fifth embodiment of the present invention, which employs a two-way (forward and backward) excitation process. In FIG. 9, parts that are the same as those shown in the previously described figures are given the same reference numbers. The light amplifier device shown in FIG. 9 includes excitation semiconductor lasers 12a and 12b, excitation driving circuits 13a and 13b, and light combining elements 19a and 19b. The excitation semiconductor lasers 12a and 12b generate exciting lights in accordance with driving currents of the excitation driving circuits 13a and 13b. The exciting lights are then applied to the optical fiber 11 in both ways through the light combining elements 19a and 19b. The input light signal applied to the optical fiber 11 is amplified therein in accordance with the exciting lights.

When the monitor circuit 16 detects a breakdown of the input light signal, the control circuit 14 drives the slow-start driving circuit 18, which gradually increases the driving current of the semiconductor laser 17. The light emitted from the semiconductor laser 17 is applied to the optical fiber 11 through the photocoupler 20, the isolator 21 and the light combining device 19a. Hence, the light to be amplified is continuously applied to the optical fiber 11, so that the light surge can be suppressed.

Part of the amplified output light signal from the beam splitter 31 is detected by the photodiode 30, which sends the detection signal to the control circuit 14. Then, the control circuit 14 controls the excitation driving circuit 13a so that the power of the exciting light from the excitation semiconductor laser 12a is controlled to maintain the amplified output light signal at a constant level.

Figure 10:
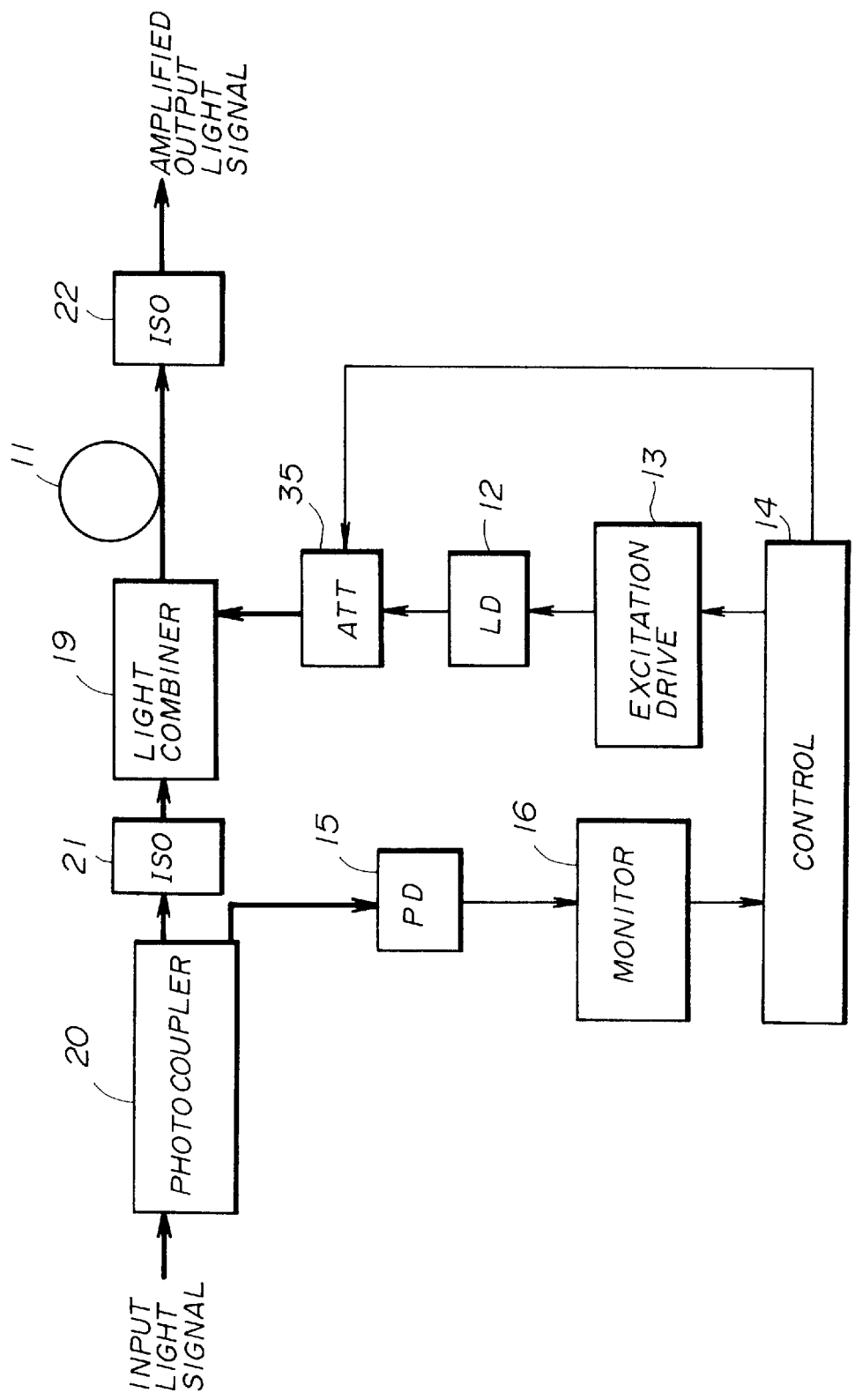
FIG. 10 is a block diagram of a light amplifier device according to a sixth embodiment of the present invention.

FIG. 10 is a block diagram of a light amplifier device according to a sixth embodiment of the present invention. In FIG. 10, parts that are the same as those shown in the previously described figures are given the same reference numbers. The light amplifier device includes a variable attenuator (ATT) 35. This variable attenuator 35 is used to attenuate the output light from the excitation semiconductor laser 12 under the control of the control circuit 14. The variable attenuator 35 can be formed of a known optical element.

The branching light from the photocoupler 20 is applied to the photodiode 15, which outputs the converted electric signal. The monitor circuit 16 detects the level of the input light signal. When the input light signal breaks down, the monitor circuit 16 outputs the breakdown detection signal to the control circuit 14 (step S31 of the flowchart showing the operation of the control circuit 14 shown in FIG. 11). Then, the control circuit 14 controls the variable attenuator 35 so that it has the maximum amount of attenuation (step S32). Hence, the amplifying gain of the optical fiber 11 is minimized.

When the input light signal is recovered and is applied to the optical fiber 11 through the photocoupler 20, the isolator 21 and the light combining element 19, the amplifying gain is at the minimum level, and thus no light surge takes place. The monitor circuit 16 detects the recovery of the input light signal because the output signal level of the photodiode 15 is increased (step S33). In response to the detection signal from the photodiode 15, the control circuit 14 controls the variable attenuator 35 so that the amount of attenuation is gradually decreased (step S34). Hence, the amplifying gain of the optical fiber 11 is minimized, so that the light surge can be suppressed.

In this case, the monitor circuit 16 determines whether the output signal of the photodiode 15 falls within a given range. When it is determined that the level of the output signal is equal to or lower than the given range, the monitor circuit 16 determines that the input light signal has broken down. When it is determined that the level of the output signal is equal to or higher than the given range, the monitor circuit 16 determines that a light surge takes place. In the above case, the monitor circuit 16 applies a light surge detection signal to the control circuit 14. When the output signal of the photodiode 15 becomes a level within the given range, the monitor circuit 16 outputs the recovery detection signal to the control circuit 14. The above function of the control circuit can easily be realized by a logic circuit for level decision or a microprocessor.

Figure 12A:
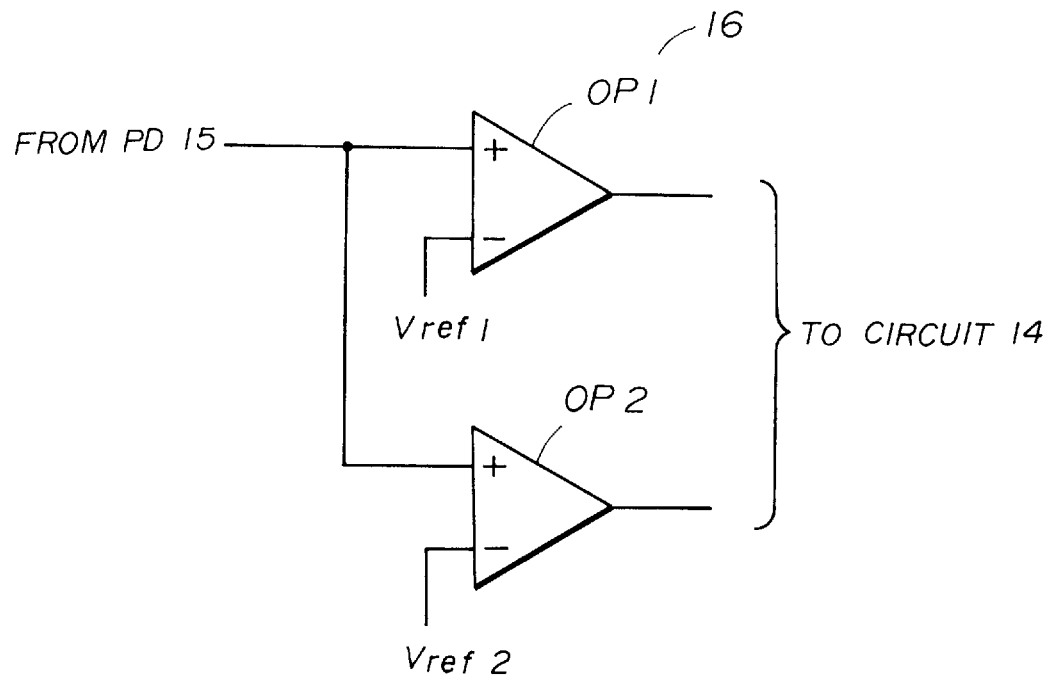
FIGS. 12A and 12B are diagrams of a monitor circuit shown in FIG. 10.
Figure 12B:
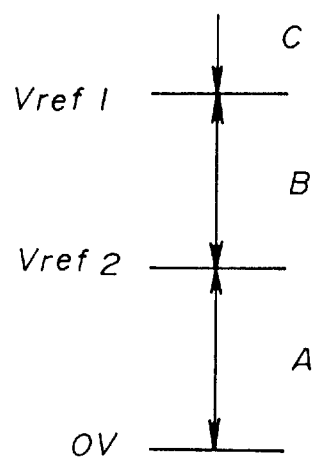

FIG. 12A is a block diagram of an example of the monitor circuit 16. The monitor circuit 16 shown in FIG. 12A is made up of two comparators OP1 and OP2 respectively formed of operational amplifiers. Reference voltages Vref1 and Vref2 are respectively applied to the two comparators OP1 and OP2. FIG. 12B shows the relationship between the reference voltages Vref1 and Vref2 with respect to 0 V. The above-mentioned predetermined range is defined as the range B between the reference voltages Vref1 and Vref2. When a breakdown of the input light signal occurs, the output level of the photodiode 15 is lower than the reference voltages Vref1 and Vref2 (range A). When a light surge takes place, the output level of the photodiode 15 is higher than the reference voltages Vref1 and Vref2 (range C).

Figure 13:
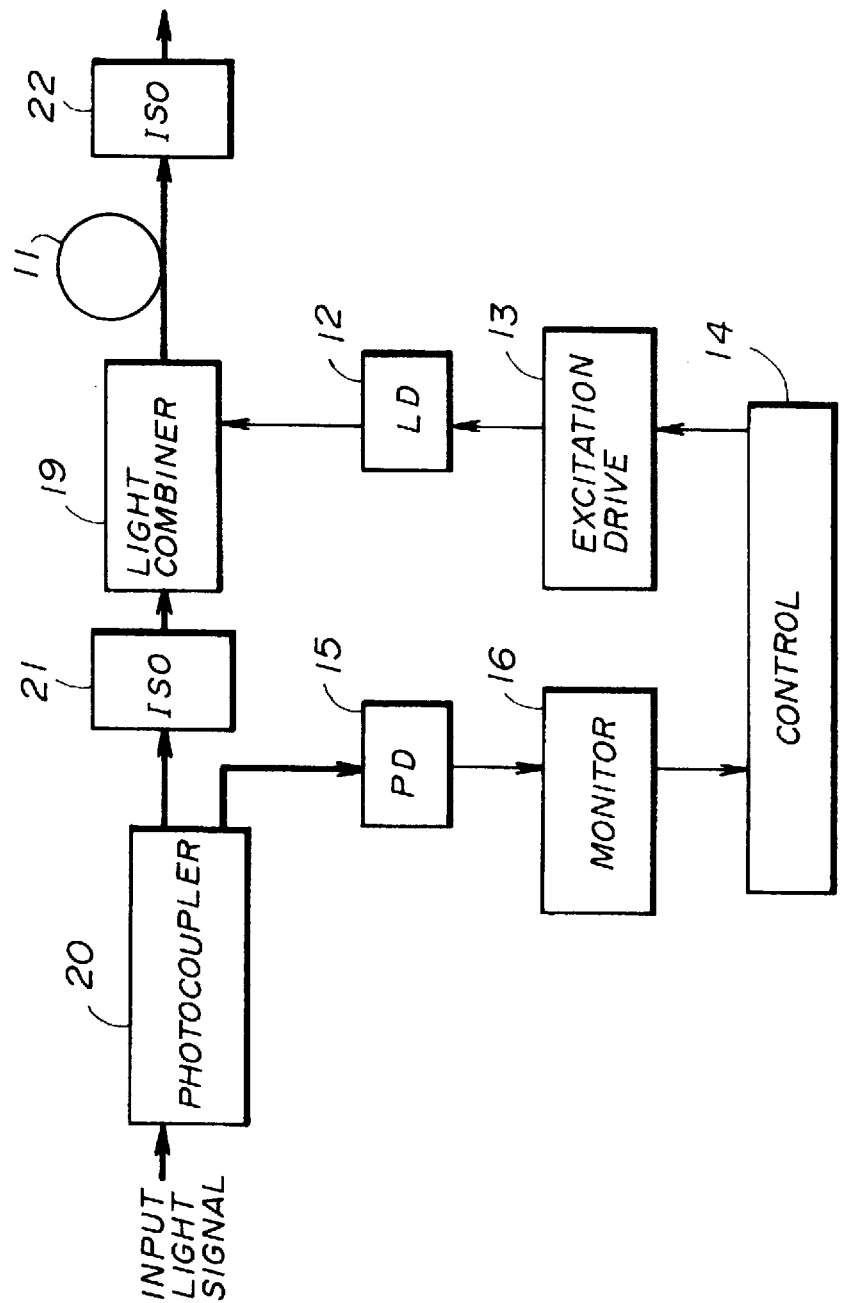
FIG. 13 is a block diagram of a light amplifier device according to a seventh embodiment of the present invention.
Figure 14:
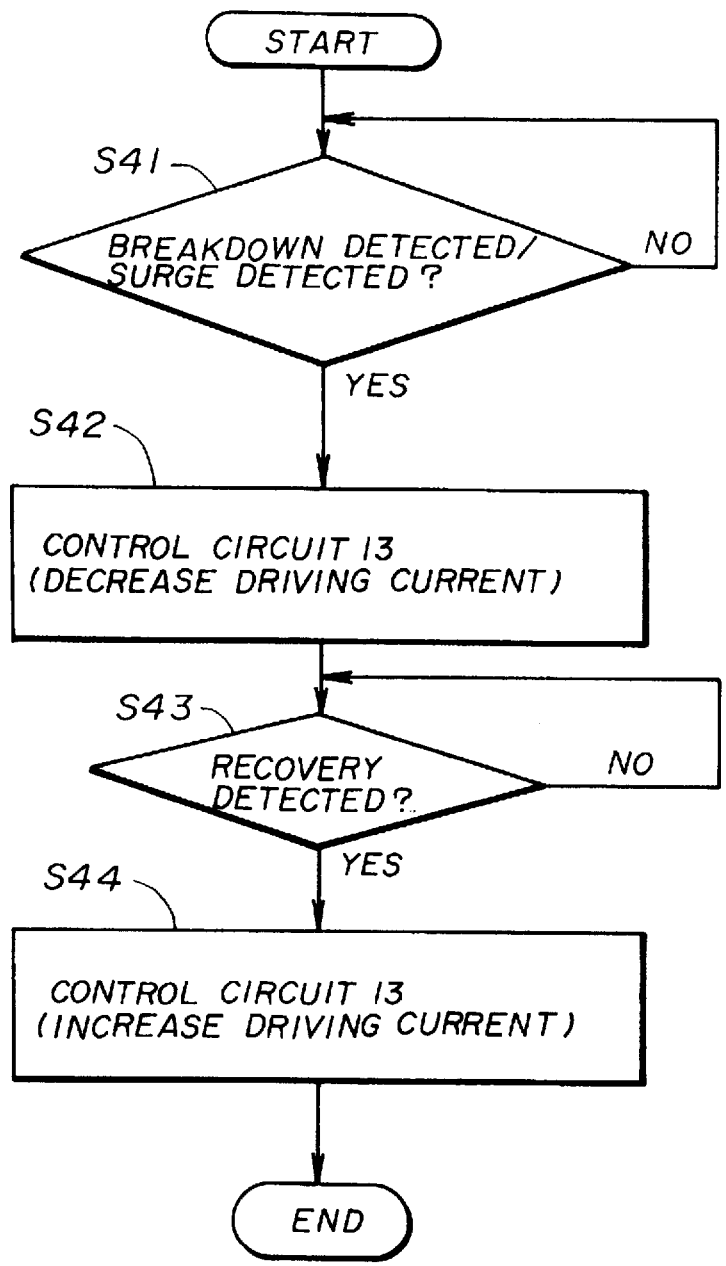
FIG. 14 is a flowchart of an operation of a control circuit shown in FIG. 13.

FIG. 13 is a block diagram of a light amplifier device according to a seventh embodiment of the present invention. In FIG. 13, parts that are the same as those shown in the previously described figures are given the same reference numbers. The monitor circuit 16 determines whether the level of the received input light signal falls within the given range. When the monitor circuit 16 determines that the level of the input light signal becomes lower than the given range, it outputs the breakdown detection signal to the control circuit 14 (step S41 of a flowchart shown in FIG. 14 showing the operation of the control circuit 14 shown in FIG. 13). In response to the breakdown detection signal, the control circuit 14 controls the excitation driving circuit 13 so that the driving current of the excitation semiconductor laser 12 is reduced and therefore the power of the exciting light is reduced (step S42). Thus, the amplifying gain of the rare-earth doped optical fiber 11 is reduced, so that no light surge occurs when the input light signal is recovered.

When a light surge is input, the output signal of the photodiode is increased. The monitor circuit 16 determines that the light surge occurs when the output signal level of the photodiode 15 becomes higher than the given range. In this case, the monitor circuit 16 outputs the light surge detection signal to the control circuit 14 (step S41). Then, the control circuit 14 controls the excitation driving circuit 13 so that the driving current of the excitation semiconductor laser 12 is reduced. Hence, the power of the exciting light is reduced and the amplifying gain of the optical fiber 11 is reduced. Hence, the light surge can be suppressed.

In the above-mentioned embodiments of the present invention, any of the forward excitation type, the backward excitation type and the two-way excitation type can be used in order to apply the exciting light(s) to the optical fiber 11. The photodiode 15 of the light-receiving part 5 for monitoring the input light signal can be formed of any of various types of photodiodes or a phototransistor. A light filter which allows only a signal component to pass therethrough can be provided before the photodiode 15. The semiconductor laser 17 used in each of the first through fifth embodiments of the present invention can be replaced by a light-emitting diode (LED) capable of emitting a light including the same wavelength as that of the input light signal. In this case, the cost can be reduced.

The present invention is not limited to the specifically disclosed embodiments, and variations and modifications may be made without departing from the scope of the present invention.

What is claimed is:

1. A light amplifier device having a rare-earth element doped optical fiber to which an input light signal and an exciting light are applied, said light amplifier device comprising:

an exciting-light emitting part which generates the exciting light which causes the rare-earth element doped optical fiber to amplify the input light signal;

a monitor part monitoring the light input signal;

a light-emitting part generating a light in a wavelength band which includes a wavelength of the input light signal; and a control part which drives, when said monitor part detects a breakdown of the input light signal, said light-emitting part so that the light generated by said light-emitting part is applied to said rare-earth element doped optical fiber.

2. The light amplifier device as claimed in claim 1, further comprising a driving part which drives, when said monitor part detects a breakdown of the input light signal, said light-emitting part so that an output of the light generated by said light-emitting part is gradually increased.

3. The light amplifier device as claimed in claim 1, wherein said light-emitting part comprises a semiconductor laser which emits a light in a wavelength band identical to that of the input light signal.

4. The light amplifier device as claimed in claim 1, wherein said light-emitting part comprises a light-emitting diode which emits a light in a wavelength band identical to that of the input light signal.

5. The light amplifier device as claimed in claim 1, further comprising a part which detects an amplified light signal from said rare-earth element doped optical fiber and controls said exciting-light emitting part so that power of said amplified light signal is maintained at a constant level.

6. The light amplifier device as claimed in claim 1, further comprising a light filter which is provided before said monitor part and allows only a signal component contained in the input light signal to be applied to said monitor part.

7. A light amplifier device having a rare-earth element doped optical fiber to which an input light signal and an exciting light are applied, said light amplifier device comprising:

an exciting-light emitting part which generates the exciting light;

a variable attenuator which attenuates the exciting light to be applied to the rare-earth element doped optical fiber;

a monitor part monitoring the input light signal; and a control part which controls said variable attenuator so that, when said monitor part detects that the input light signal is outside of a given range, an amount of attenuation of said variable attenuator is increased.

8. The light amplifier device as claimed in claim 7, further comprising a part which detects an amplified light signal from said rare-earth element doped optical fiber and controls said exciting-light emitting part so that power of said amplified light signal is maintained at a constant level.

9. The light amplifier device as claimed in claim 7, further comprising a light filter which is provided before said monitor part and allows only a signal component contained in the input light signal to be applied to said monitor part.

10. A light amplifier device having a rare-earth element doped optical fiber to which an input light signal and an exciting light are applied, said light amplifier device comprising:

an exciting-light emitting part which generates the exciting light;

a driving part which supplies a driving current to said exciting-light emitting part to drive the same;

a monitor part monitoring the input light signal; and a control part which controls said driving part so that, when said monitor part detects that the input light signal is outside of a given range, the driving current supplied by said driving part is decreased.

11. The light amplifier device as claimed in claim 10, further comprising a part which detects an amplified light signal from said rare-earth element doped optical fiber and controls said exciting-light emitting part so that power of said amplified light signal is maintained at a constant level.

12. The light amplifier device as claimed in claim 10, further comprising a light filter which is provided before said monitor part and allows only a signal component contained in the input light signal to be applied to said monitor part.

13. The light amplifying circuit as claimed in claim 2, wherein said driving part includes a transistor, a bias source, resistors and a choke coil.

* * * * *